United States Patent
Lopez de Victoria

(10) Patent No.: US 7,639,738 B2
(45) Date of Patent: Dec. 29, 2009

(54) EFFICIENT CHANNEL SHORTENING IN COMMUNICATION SYSTEMS

(75) Inventor: Fernando Lopez de Victoria, Pacific Palisades, CA (US)

(73) Assignee: Acorn Technologies, Inc., Santa Monica, CA (US)

( * ) Notice: Subject to any disclaimer, the term of this patent is extended or adjusted under 35 U.S.C. 154(b) by 595 days.

(21) Appl. No.: 11/472,196

(22) Filed: Jun. 21, 2006

(65) Prior Publication Data

US 2007/0297499 A1    Dec. 27, 2007

(51) Int. Cl.
*H03H 7/30* (2006.01)

(52) U.S. Cl. .................. 375/232; 375/350; 375/231; 375/354; 375/229; 370/495; 370/503; 714/746; 714/758

(58) Field of Classification Search ................ 375/232, 375/350, 354, 229, 231; 370/495, 503; 714/746, 714/758
See application file for complete search history.

(56) References Cited

U.S. PATENT DOCUMENTS

| | | | |
|---|---|---|---|
| 5,285,474 A | 2/1994 | Chow et al. | |
| 5,870,432 A | 2/1999 | Van Kerckhove | |
| 5,995,568 A * | 11/1999 | Molnar et al. | ................ 375/354 |
| 6,341,298 B1 | 1/2002 | Ilani | |
| 6,396,886 B1 | 5/2002 | Kapoor | |
| 6,438,161 B1 | 8/2002 | Farhang-Boroujeny | |
| 6,535,552 B1 | 3/2003 | Pessoa | |
| 6,628,704 B1 | 9/2003 | Long | |
| 6,631,175 B2 | 10/2003 | Harikumar | |
| 6,674,795 B1 | 1/2004 | Liu | |
| 6,687,291 B1 | 2/2004 | Lee | |
| 6,785,328 B2 | 8/2004 | Harikumar | |
| 6,829,296 B1 * | 12/2004 | Troulis et al. | ................ 375/232 |
| 6,892,339 B1 * | 5/2005 | Polk et al. | ................ 714/746 |
| 6,961,372 B2 | 11/2005 | Liang | |
| 6,975,677 B2 | 12/2005 | Matsumoto | |
| 7,133,809 B1 * | 11/2006 | Purkovic et al. | ................ 703/2 |
| 2003/0007573 A1 | 1/2003 | Baldemair | |
| 2003/0112861 A1 | 6/2003 | Erdogan | |
| 2003/0227967 A1 | 12/2003 | Wang | |
| 2004/0165674 A1 | 8/2004 | Huang | |
| 2004/0202260 A1 | 10/2004 | Tung | |

(Continued)

FOREIGN PATENT DOCUMENTS

WO    WO 01/78340 A2    10/2001

OTHER PUBLICATIONS

Richard K. Martin, et al., Efficient Channel Shortening Equalizer, pp. 1-10, (to appear in Eurasip Journal on Applied Signal Processing).

(Continued)

*Primary Examiner*—Chieh M Fan
*Assistant Examiner*—Eva Y Puente
(74) *Attorney, Agent, or Firm*—Orrick, Herrington & Sutcliffe, LLP

(57) ABSTRACT

A communication system includes a channel shortening filter to reduce intersymbol interference and facilitate recovery of communications. The channel shortening filter preferably includes a energy concentration filter that optimizes SNR or SINR or other performance criterion and a impulse response tail canceller filter that eliminates energy or, equivalently, cancels coefficients outside the allowed delay-spread window for the channel. Preferably the filters are calculated using signal decomposition.

13 Claims, 3 Drawing Sheets

U.S. PATENT DOCUMENTS

2005/0053127 A1* 3/2005 Shiue et al. .................. 375/232

OTHER PUBLICATIONS

PCT Search Report and Written Opinion dated Jun. 11, 2007.
Güner Arslan, "Equalization for Discrete Multitone Transceivers to Maximize Bit Rate," IEEE Transactions on Signal Processing, vol. 49, No. 12, pp. 3123-3135, Dec. 2001.

Xiaoli Ma, et al., "Channel Shortening Equalization for Differential OFDM Systems," 2005 IEEE $6^{th}$ Workshop on Signal Processing Advances in Wireless Communications, pp. 860-864.

Richard K. Martin, et al., "Unification and Evaluation of Equalization Structures and Design Algorithms for Discrete Multitone Modulation Systems," IEEE Transactions on Signal Processing, vol. 53, No. 10, Oct. 2005.

* cited by examiner

EFFICIENT CHANNEL SHORTENING IN COMMUNICATION SYSTEMS

BACKGROUND

1. Field of the Invention

The present invention relates to communication systems and, in particular, to receivers that use channel shortening methods.

2. Description of the Related Art

Transmissions in modern digital communication systems are made up of data bursts or pulses defined by a well-known modulation scheme and sent through a channel. In an ideal transmission channel there is only a pure delay affecting each pulse and there is no interference between pulses. The signal received from an ideal channel is a delayed replica of the transmitted signal. In reality, and most adversely in wireless channels, there are a number of delay paths in the channel and the delays may be time varying. These delays cause inter-symbol interference (ISI) that degrades transmission and reduces achievable bit rates. Therefore, prior to demodulation at the receiver, the receiver typically calculates a filter and applies that filter to correct the ISI degradation prior to demodulation.

A filter that controls the amount of ISI between symbols in multi-carrier modulated signals is usually termed a channel-shortening filter (CSF). A filter can be designed from statistical measures of the received signal to shorten the delay spread of the channel. Depending on channel characteristics, the filter can be designed to simultaneously suppress interference sources. It can be said that the CSF shortens the total time dispersion over which the channel has its maximum delay spread.

Multi-carrier modulation (MCM) techniques such as orthogonal frequency division modulation (OFDM) are gaining wider application in wireless and wireline communication systems. MCM systems benefit from channel shortening filters to restrain ISI dispersion to within a pre-determined time guardband defined by the system. Since the time guardband contains the initial symbol samples, it is termed the cycle prefix (CP). OFDM with a channel-shortening CP filter (CSF) has been incorporated into a variety of standards like DSL, WiMax (802.16), WiFi (802.11), digital video broadcast (DVB), digital audio broadcast (DAB) and personal area networks (802.15). The time guardband between symbols allows a CSF to mitigate time channel dispersion without requiring a receive filter to remove all time dispersions. In DSL applications, the CSF is given the name of a time equalizer (TEQ).

Recent OFDM applications insert a long time guardband between symbols to reduce the need for a TEQ at the receiver. The assumption made is that the TEQ is unnecessary if a time guardband greater than the maximum (significant) delay is used. This time guardband drops the achievable bit rate by increasing the symbol duration but allows use of a simplified receiver. Conventional CSF/TEQ calculations are computationally intensive.

In some applications, it is preferable to include a TEQ. In DSL applications, for example, the channel dispersion has delayed paths of significant power that make the use of an adequate time guardband impractical. Therefore, DSL is typically implemented with a TEQ. Wi-Fi (IEEE 802.11) and WiMax (IEEE 802.16) allocate a time guardband to mitigate the time dispersions expected in the channel, which necessarily reduces the system throughput. The nature of wireless cellular networks is such that interference from other sources and adjacent cells also lower operational bit rates. In wireless systems, the time dispersions and interferences are time-varying depending on the receiver's speed of motion, which is not found in DSL systems. So time guardbands are only moderately effective in optimizing the performance of these, and other, wireless transmission systems.

Multi-carrier modulation is not the only communication system benefiting from a CSF. A maximum likelihood sequential estimation (MLSE) receiver is the optimum receiver in many communication systems. The complexity of an MLSE receiver grows exponentially with the number of coefficients in the channel. Therefore, a CSF is chosen to control receiver complexity by shortening the channel to a target delay spread value and to provide the new overall channel response for MLSE calculations. In multi-user detection (MUD) systems with flat-fading channels, the application of a CSF also reduces the optimum receiver complexity.

A performance issue with channel shortening filters is that the resulting channel of the transmission channel convolved with the CSF response has an impulse response extending to the target delay spread. This overall response, called the target impulse response (TIR), can affect performance. Therefore, a CSF Design 146 method typically determines a TIR that will maximize a performance criterion.

DSL systems typically require two equalizers, one for the time domain equalization (TEQ) to shorten the channel, and another for per-frequency corrections in amplitude and phase called a frequency equalizer (FEQ). The TIR determines the FEQ design.

Conventional communication systems, like those illustrated in FIG. 1, determine the CSF filter in "one-shot." That is, the receiver determines a single filter to simultaneously satisfy the TIR and the target delay spread criteria. Referring to FIG. 1, a modulator 120 modulates the information bits 110 in accordance with the chosen waveform. The channel 130 represents all the interference, noise and ISI incurred in the transmission of the modulated signal as seen by the CSF 142. Channel 130 is modeled to include the actual channel dispersion, the receiver's analog front-end filter and any pulse shaping filter at the transmitter used to control the modulated signal's bandwidth. Quantization noise and analog front-end amplifier noise are the two usual noise sources included in the model. In DSL and wireless applications, there will also be interference sources from other telephone lines or cell sites. The CSF 142 provides an overall impulse response to the demodulator 144 that is designed to not exceed a target delay and to maximize a performance criterion. The CSF Design 146 calculates the required statistics and signal decomposition necessary to achieve the filter performance goals (i.e., meeting TIR and delay spread constraints).

Researchers have developed computationally efficient approaches to calculate the filter coefficients in the CSF Design 146. Generally, the algorithms for CSF Design 146 are based on the measured properties of the received signal and use linear algebra techniques to calculate the filter coefficients. For this reason, the CSF 142 is most typically a finite impulse response (FIR) filter.

The CSF Design 146 in FIG. 1 involves a number of steps and optimizations. The process includes:
1. Select a performance criterion
2. Estimate channel 130 coefficients
3. Calculate a TIR
4. Calculate the CSF 142 for a given delay $\Delta_i$
5. Repeat steps 3 and 4 for a next possible delay i+1
6. Select optimum CSF over all delays The CSF 142 can be designed to optimize one of various performance criteria. In the case of OFDM, the optimization criterion may be dependent on the communication system. In DSL applications, the optimization is related to the achievable bit rate. Wireless applications seek to optimize SINR, which can be represented via a number of performance criteria. The maximum shortening SNR (MSSNR), which maximizes the ratio of the energy in the admissible delay spread (i.e., the TIR time span) to the energy outside that interval, is one such an SINR maximization criterion. Another criterion to maximize SINR is the traditional minimum mean square error (MMSE) criterion. In the case of an additive white Gaussian channel, the MMSE and MSSNR criteria determine the same CSF.

CSF Design 146 methods conventionally require knowledge of the channel coefficients to estimate the CSF 142. FIG. 2 shows how most conventional CSF Design 146 methods accomplish the filter design. The model uses knowledge of the channel coefficients 210 to determine a TIR 224 and, given a choice of a particular delay 222, to calculate the resulting CSF 220. Therefore, the first step is to estimate the channel coefficients over a sufficiently long delay spread. Various methods can be implemented to estimate the channel coefficients from the training symbols or pilot tones, depending on the signal of interest.

For the MMSE criterion, the TIR 224 is calculated as the eigenvector corresponding to the smallest eigenvalue of a delay-dependent auto-covariance matrix. This delay-dependent matrix involves the calculation of the inverse of the auto-covariance matrix for the received signal. Calculation of this matrix inverse is very computationally expensive for each delay; hence the MSSNR criterion typically provides lower complexity.

For either the MMSE or the MSSNR criterion, the generalized eigenvalue system is solved for each delay to obtain the desired TIR 224, which is preferably the optimum TIR, and subsequently, the CSF 220.

Subsequent to the TIR calculation, the MMSE CSF is calculated for a specific delay $\Delta_i$ by solving a generalized eigenvector problem with auto-covariance and cross-covariance matrices. These covariance matrices are calculated by averaging the prescribed products of the received signal and the training sequence or sequences. While determining the TIR requires a search for the eigenvector associated with the minimum eigenvalue of a delay-dependent auto-covariance matrix, the CSF is calculated by solving a generalized eigenvector equation involving the auto- and cross-covariance matrices. This calculation is repeated for each delay, since the TIR is a variable in the generalized eigenvector equation.

In the case of the MSSNR criterion, a generalized eigenvector equation is solved to determine the CSF. That is, the eigenvector corresponding to the smallest eigenvalue must be estimated for each possible delay. The generalized eigenvector equation contains two matrices completely constructed from the known, or estimated, channel coefficients. Unlike the MMSE criterion, the MSSNR does not require a TIR calculation, as the TIR is inherent in the way that the matrices are constructed from the channel impulse response coefficients so that the TIR is uniquely determined. In the case of additive white Gaussian noise (AWGN), the TIR is the same for both criteria, though the MSSNR is suboptimal to the MMSE in all other cases.

Although the maximization or minimization criteria in these CSF Design 144 methods vary, there are common elements to a majority of these design methods: (1) implement the CSF as a single filter that achieves the performance criterion and channel shrinking simultaneously; (2) maximize the CSF coefficients through generalized eigenvector matrix decompositions; (3) at each iteration calculate the optimum filter delay for at most L different filters, where L is the CSF Filter 142 length; and (4) calculate a TIR (in most cases).

SUMMARY OF THE PREFERRED EMBODIMENTS

An aspect of the invention provides a communication system including a channel shortening filter. The channel shortening filter comprising an energy concentration module receiving an input signal corresponding to a signal received from a channel. The energy concentration module is adapted to concentrate energy within a predetermined delay spread of the channel according to a performance criterion. The channel shortening filter further comprising a cancellation module responsive to a combined impulse response of the channel and the energy concentration module. The cancellation module provides an output that adjusts an output of the energy concentration module to correspond to a target impulse response for the channel.

Another aspect of the invention provides a communication system including a channel-shortening filter comprising an energy concentration filter receiving an input signal corresponding to a signal received from a channel. The energy concentration filter being adaptive to the channel to optimize energy within a target delay spread according to a performance criterion. The channel shortening filter further comprises an impulse response tail canceller filter responsive to the channel and the energy concentration module to identify coefficients of the energy concentration filter outside of the target delay spread of the channel and provide an output that cancels the coefficients of the energy concentration filter outside of the target delay spread of the channel.

Still another aspect of the invention provides a communication system including a channel-shortening filter comprising an energy concentration filter receiving an input signal corresponding to a signal received from a channel. The energy concentration filter optimizes an energy distribution within a target delay spread of the channel according to a performance criterion. The channel shortening filter further comprises an impulse response tail canceller filter responsive to the channel and the energy concentration module to identify coefficients of the energy concentration filter outside of the target delay spread of the channel and provide an output that cancels the residual energy of the energy concentration filter outside of the target delay spread of the channel.

BRIEF DESCRIPTION OF THE DRAWINGS

Aspects of the present invention are illustrated in the attached drawings and can be better understood by reference to those drawings in conjunction with the detailed description. The attached drawings form a part of the disclosure.

DETAILED DESCRIPTION OF THE PREFERRED EMBODIMENTS

Figure 1:
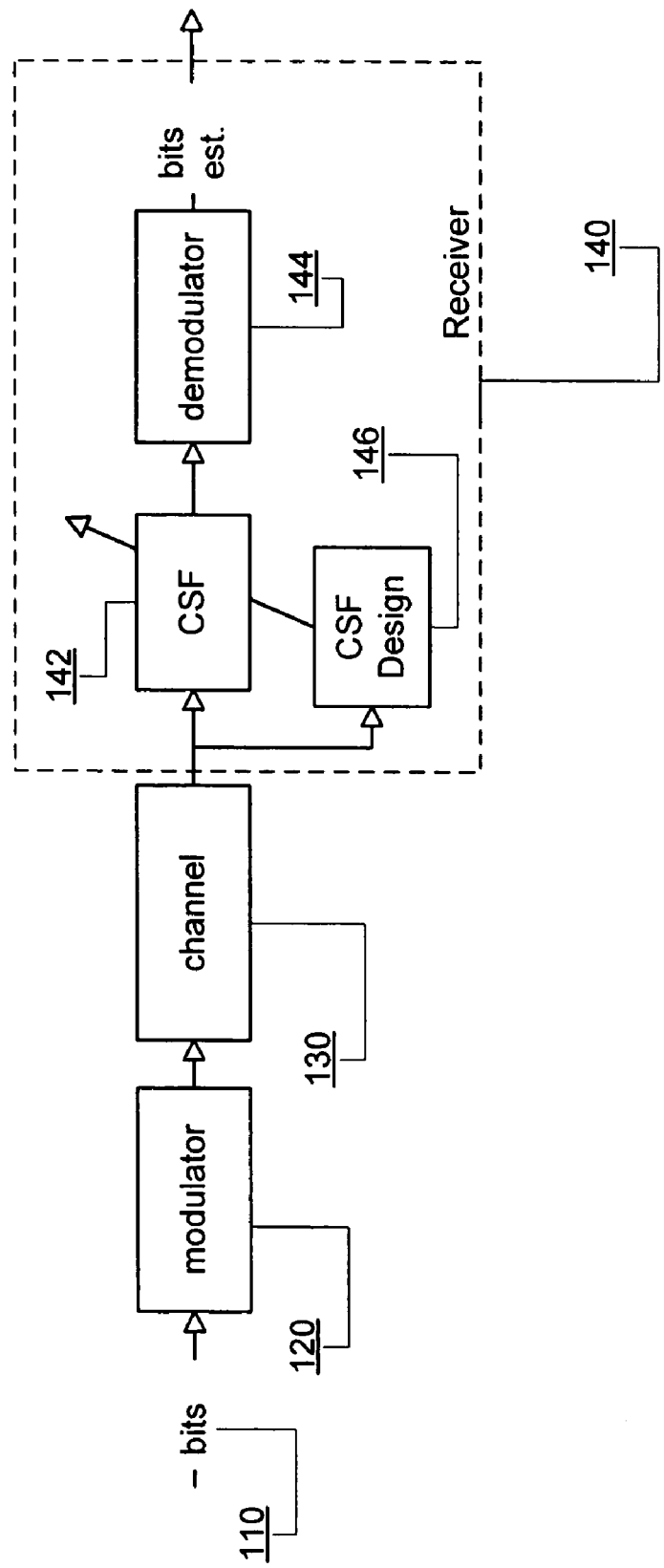
FIG. 1 schematically illustrates a communication system including a channel-shortening filter (CSF).

Aspects of the present invention may be implemented in a communication system that includes a receiver coupled to receive data or communication signals from a channel. The receiver preferably includes a channel-shortening filter that reduces intersymbol interference and facilitates recovery of data or communication signals. Preferably the channel-shortening filter is positioned to receive signals from the channel and to output filtered signals to a demodulator that demodulates or further processes the signals. The channel-shortening filter preferably includes a energy concentration filter that optimizes SNR or SINR or other performance criterion and a impulse response tail cancellation filter that eliminates energy or, equivalently in a transfer function sense, cancels coefficients outside the allowed delay-spread window for the channel. Preferably the filters are calculated using signal decomposition.

Preferred implementations of the present invention provide two filters that in combination optimize a performance criterion and shorten the channel. Most preferably, this is achieved in a computationally efficient manner that does not require calculations of eigenvalues and eigenvectors or direct calculations of covariance matrices. Implementations may provide an appropriate filter without an optimization over multiple delays or using a simplified optimization process. Certain particularly preferred embodiments utilize a single, channel dependent, target impulse response (TIR).

Given the complexity of the channel shortening filter (CSF) computation and the low-complexity constraints of typical applications such as wireless OFDM receivers, a fast-tracking and low-complexity solution is desired. To be useful for this type of application, the complexity of the receiver should be feasible. In addition, the calculations should be able to track some maximum receiver motion speed in mobile applications. Aspects of the present invention are also applicable to stationary applications such as DSL, wireline, wireless modem and other fixed station applications.

Preferred embodiments of the present invention utilize signal decomposition. Signal decomposition is widely used in image and audio compression. The concept is that the dimensions representing the signal uniquely, such as an L dimension space, require fewer dimensions to represent most of the signal's energy. The simplest case is that of a single sinusoid, where the Fourier transform needs only one coefficient to represent the frequency and phase, while in the time domain, many more samples are required to uniquely represent the signal.

Signal decomposition can be applied to the impulse response of a filter. That is, a "full rank" $L_{FR}$ taps filter solution to the CSF can be decomposed as the sum of $L_{FR}$ filters weighted by $L_{FR}$ scalars to determine the filter uniquely. The $L_{FR}$ scalars, also called coordinates, may have many values that are too small to contribute significantly to the full-rank filter representation. The CSF preferably compresses the filter dimension so that it is represented by $L_S$ filters and their corresponding scalars. This is said to comprise a subspace approximation to the desired filter impulse response. This approach is effective when $L_S$ is much smaller than $L_{FR}$ so that the approximation achieves a computational advantage. That is, if the filter length is $L_{FR}=128$, then $L_S$ is most preferably on the order of three to eight, for example, so that the approach provides a desirable level of complexity reduction.

Although it may seem like an increase in complexity to compute $L_S$ filters and their respective coordinates, preferred embodiments achieve reduced complexity by avoiding the direct computation of the full auto-covariance matrix, the inverse of the full auto-covariance matrix or one of the well-known matrix decompositions (e.g., Cholesky factorization, eigenvalue/eigenvectors) and their inverses. Many conventional CSF computations require an order of $O(L_{FR}^2)$ computations, while certain of the implementations described here may be accomplished using an order of $O(L_{FR})$ computations.

Figure 2:
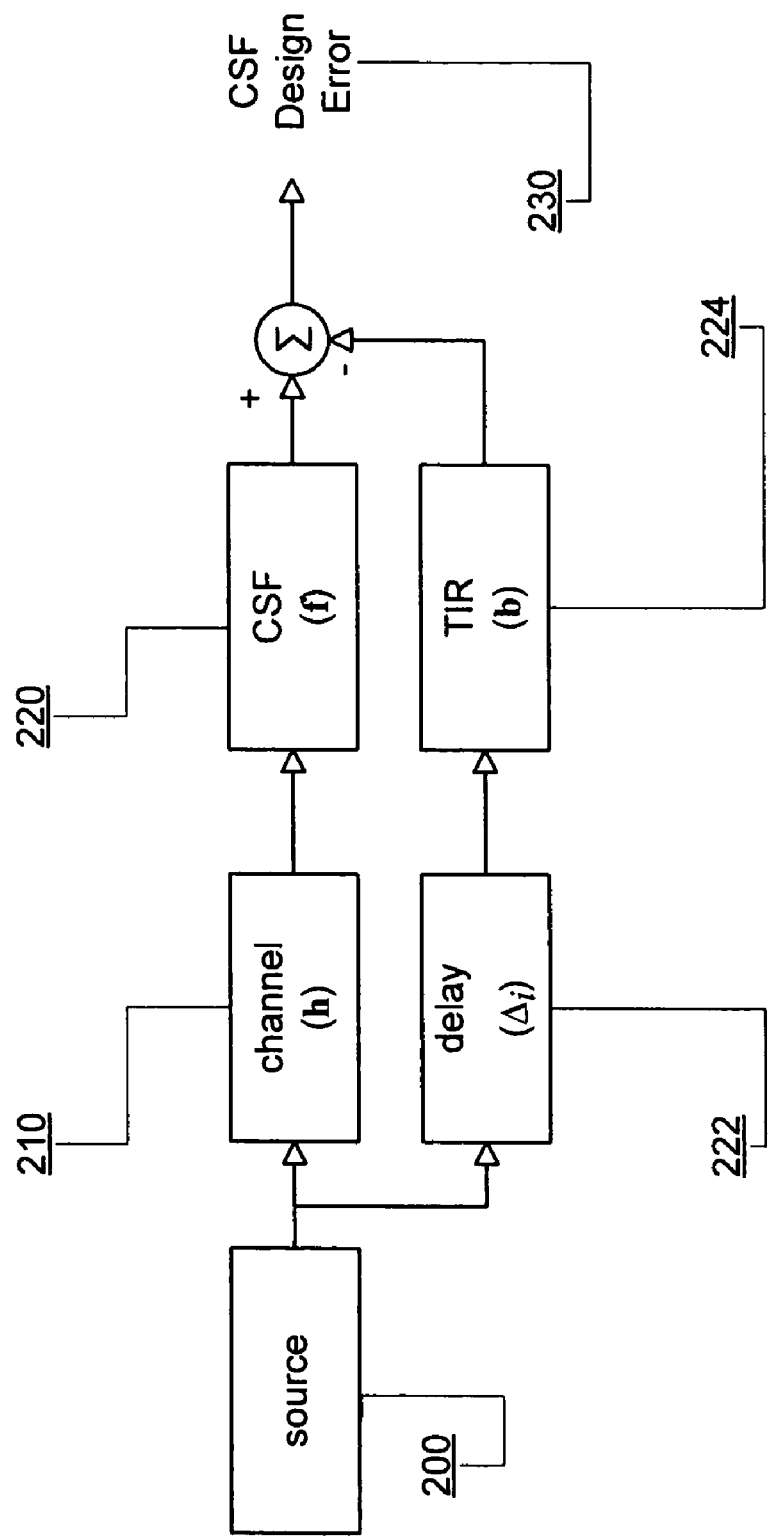
FIG. 2 schematically illustrates a model that might be used in determining a channel-shortening filter (CSF).
Figure 3:
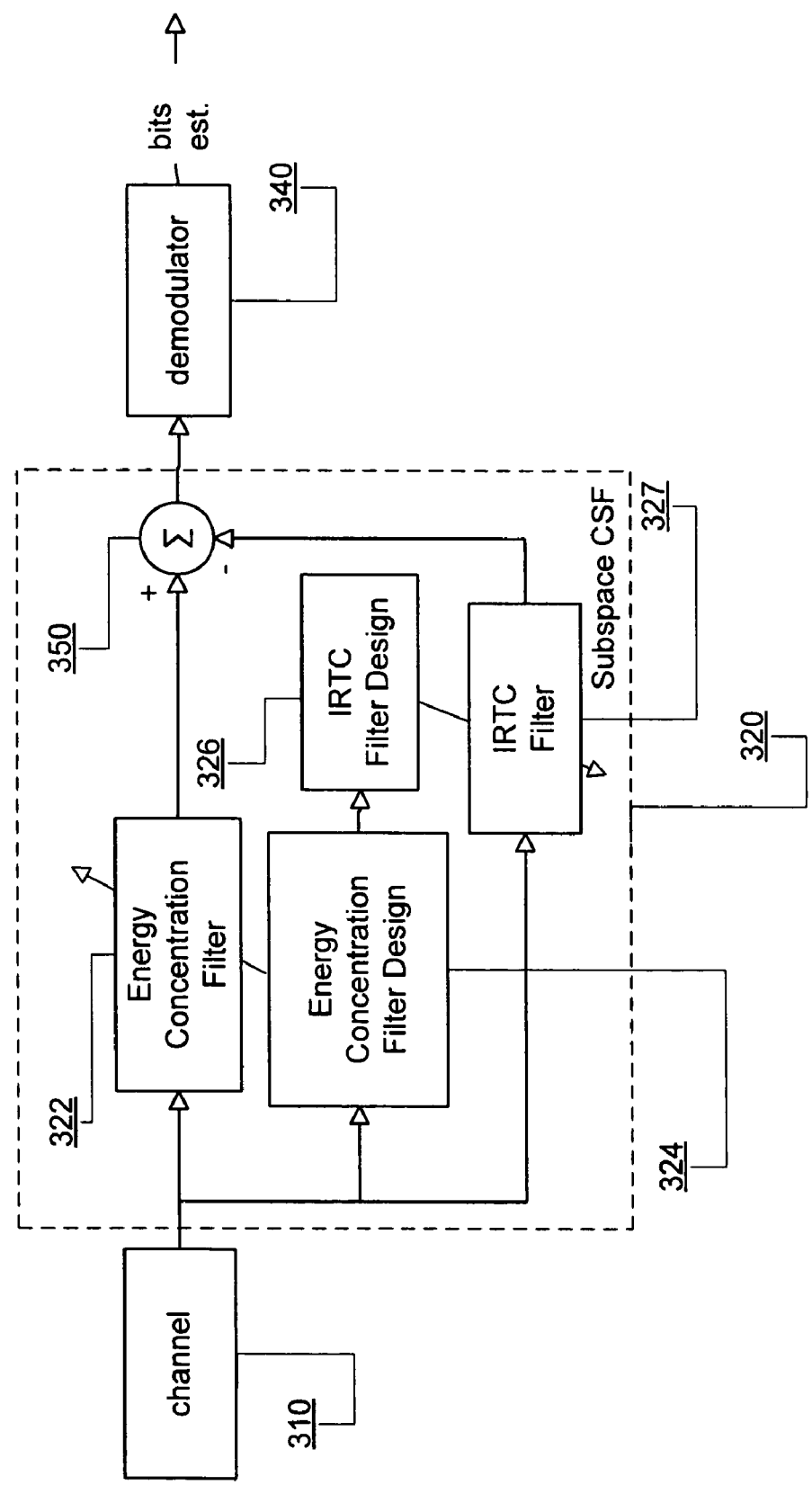
FIG. 3 schematically illustrates a design and implementation of a channel shortening filer (CSF) according to preferred aspects of the present invention.

A simple implementation of a CSF according to the present invention is shown in FIG. 3. FIG. 3 illustrates a receiver positioned to receive and demodulate signals from the channel 310. The receiver includes a channel shortening filter 320 and a demodulator 340 that receives filtered signals or data output from the channel-shortening filter and applies the demodulation and decoding functions associated with the communication system. As illustrated, the channel-shortening filter is provided between the channel 310 and the demodulator 340. The channel-shortening filter 320 of FIG. 3 preferably includes two functional blocks 322, 327 that may represent two filtering operations. At least conceptually, the filtering operations of the blocks 322 and 327 are performed in a single filter and in a single process in the FIG. 2 filter and are separated and performed in distinct steps and as distinct processes in the filter of FIG. 3. Separating these operations can allow simplification of the channel shortening filter and the overall receiver so that it can be used in a wider range of applications.

The channel-shortening filter 320 includes an energy concentration filter (ECF) 322 that optimizes the signal over interference plus noise ratio (SINR) in the mean square error (MSE) sense. This filter may not yield an equivalent target impulse response (TIR) that meets the delay-spread requirements. Therefore, a second filter preferably cancels the combined channel 310 and ECF 322 impulse responses at the tails outside of the target delay spread of the channel. The impulse response tail canceller (IRTC) filter 327 preferably uses the received signal and the ECF 322 to calculate the coefficients outside the target delay-spread window to be cancelled.

The purpose of the ECF 322 is to transfer the energy spread over multiple paths in the channel so that most of the energy is desirably confined within the target delay spread of the channel (i.e., the CP duration). It is well known that the channel-matched filter maximizes the signal to noise ratio (SNR) for additive white Gaussian noise (AWGN). However, a matched-filter may not achieve two other goals desired in a CSF: confining the energy within the target delay-spread requirement and reducing the number of coefficients of the combined channel 310 and matched filter impulse response. The ECF Design 324 preferably uses the matched-filter to maximize SNR, but also confines the energy within the target delay-spread.

As the ECF 322 filters the received signal, the impulse response widens, possibly beyond the boundaries set by the target delay spread. The IRTC Filter Design 326 uses the input signal and the impulse response of the ECF 322 to calculate the coefficients to be cancelled. The canceller output 350 has a target impulse response (TIR) that is equal to the center of the combined channel 310 and ECF 322 impulse response. To find the optimum delay for the IRTC filter 327, the IRTC Filter Design 326 preferably chooses the maximum magnitude in the combined channel 310 and ECF 322 impulse response.

The design of the ECF 322 and IRTC filter 327 can be determined with many well-established numerical linear algebra techniques to obtain a full-rank or subspace solution. Preferred implementations use subspace methods to approximate the full-rank solution. This full-rank approximation preferably is used only for the IRTC filter 327, since the ECF 322 most preferably is a low-rank approximation of an MMSE filter.

Preferred implementations of the present invention decompose the two functions of the illustrated CSF into two separate filters. Maximizing the SINR is achieved with one filter (ECF) and channel-shortening is achieved with a canceling filter (IRTC). Beyond this structural difference, preferred embodiments of the present invention provide a number of computational simplifications to facilitate fast computation, which simplifications are highly preferred for wireless applications. Particularly advantageous embodiments may provide (1) easy determination of an optimum delay; (2) avoidance of computationally intensive matrix decompositions and inversions for large matrices; and (3) determination of a TIR as a natural consequence of the computation without further decomposition.

The convolution of two cascaded filters (such as ECF 322 and IRTC filter 327) to obtain an overall impulse response of the two filters can be done in a number of ways. For instance, Z-transforms may be used. The convolution of two filters can be expressed by the multiplication of two polynomials, each a Z-transform of the filter coefficients. On the other hand, linear algebra implementations of filter convolutions are particularly well suited for use with typical hardware, software and multi-dimensional signal processing. Linear algebra is also advantageously used to better represent deterministic and statistical signal processing.

A filter can be represented as a column vector f and has a number of coefficients $L_f$. Another filter h has $L_h$ coefficients. Vectors are represented by bold letters in this discussion. The convolution of the two filters provides the overall response from the two filters; the convolution will have $L_f + L_h - 1$ coefficients. The convolution and overall impulse response of the two filters is:

$$t = Hf \quad (1)$$

where the matrix H is completely determined by the filter-vector h, and the multiplication between the matrix and the vector results in a vector t with the desired convolution result. The matrix H is of dimension $(L_f + L_h - 1)$ rows by $L_f$ columns and is termed a convolution matrix. Since the computation of any matrix row times the f vector consists of $L_f$ multiplies and $L_f$ adds, the convolution is readily realized in hardware or in software, within for example a DSP.

If the input signal, at a discrete-time index n, to the channel is x[n], a discrete linear model for the channel output is the convolution of the channel coefficients with the input signal, plus uncorrelated noise v. The linear model for a time-invariant channel is $$y^H[n] = x^H[n]H + v^H[n] \quad (2)$$

where the length of the vector (or hardware registers) y is $L_f$. The notation $(\cdot)^H$ indicates a conversion from row to column vector (or transpose), and conjugation of the complex values in a vector. The samples x[n] to $x[n+L_f+L_h-1]$ are placed into the regressor-vector x to obtain the desired convolution operation shown in Equation 1. A register that contains data shifted into it along with the current and previous values is usually termed a "regressor," to distinguish it from a register that contains a filter, even if adaptive. The filter output is determined by the multiplication of two vectors:

$$z[n] = y^H[n]f \quad (3)$$

where the output z is a scalar.

It is possible to extend the model and implementation set out in the above equations (1-3) to calculate overall impulse responses and filter outputs to achieve a desired, or target, response t for a channel shortening filter (CSF). It is possible to continue with the same representation and desired statistics to establish optimum performance through the choice of filter f.

In a conventional CSF, the filter f is calculated to maximize a performance criterion (e.g., maximization of SNR), while simultaneously reducing the delay spread of the channel to within a target range. That is, the non-zero coefficients in t span a delay spread smaller than the channel and within a specified range. The conventional result is a single filter that addresses both goals through a trade-off between the performance goal (e.g., maximization of SNR) and channel shortening.

Particularly preferred embodiments of the present invention provide two filters. The first filter optimizes a performance criterion and concentrates most of the channel energy within the target delay spread, and the second filter cancels the energy beyond the target delay spread. Most preferably the filter is determined through a "subspace" representation of the channel shortening filter (CSF) f and provides improved tracking in the presence of receiver motion. Preferably the determination of both filters is based on subspace algorithms to achieve significant complexity reduction.

Calculations for filters usually involve the multiplication of the inverse of a matrix times a vector. For example, $$f = (A^H A)^{-1} A^H b \quad (4)$$

where both A and b describe an input/output relationship in a system. Equation 4 uses the well-known least-squares formulation applied to many physical problems involving system inputs and measured outputs. An alternate approach to the inversion of a matrix is to calculate the singular value decomposition (SVD) of the matrix A. Alternatives exist based on other matrix decompositions. Robustness and computation complexity are the main advantages of non-full-rank matrix inversions.

An important feature of the SVD, and similar methods, is the ability to use so-called "low-rank" matrix approximations to simplify the matrix inversion problem. That is, if the matrix A exhibits a preponderance of almost-zero "singular values" in the SVD, then a few basis vectors, corresponding to the large singular values, approximate the matrix A. Selecting and using the basis vectors to represent the matrix A effects a "compression" of the matrix A and reduces computational complexity. For example, a transform can be used to obtain a signal representation that requires fewer samples, as compared to the natural indexing of the measured values. This subspace representation is controllable to achieve a very good approximation in lossy applications.

In particularly preferred embodiments, low-rank approximations are used to invert a matrix and most preferably at a lower computational cost than many matrix decomposition strategies. These low-rank approximations are advantageous in the computation of both filters.

To control computational complexity, preferred implementations of the system of FIG. 3 use subspace methods to calculate the filters. Any filter can be represented trivially as, $$f = If \quad (5)$$

where I represents the identity matrix. Each column of I is represented by a basis of elemental vectors. An elemental basis vector $e_n$ has a 1 at location n, and otherwise has zero entries. The corresponding value at location n in f, noted as $f_n$, is the weight on $e_n$. That is, $$f = If = \sum_{n=1}^{L_f} f_n e_n \qquad (6)$$

where $|f_n|^2$ indicates the weighting of the $n^{th}$ basis vector in representing f. It is possible to find a more compact representation for f such that the number of basis vectors is much less than $L_f$. This approximation gives $$f \approx \sum_{n=1}^{A} \alpha_n f_n = f_1 - \sum_{n=2}^{A} \alpha_n f_n = \alpha_1 f_1 - F\alpha \qquad (7)$$

where, $$F = [f_2 f_3 \ldots f_A]$$

$$\alpha = [\alpha_2 \alpha_3 \ldots \alpha_A]^T \qquad (8)$$

and A is the dimension of the subspace approximation to the full-rank vector filter f. A good basis will result in A being much smaller than $L_f$ and meets the condition $$\sum_{n=1}^{L_f} |f_n|^2 \approx \sum_{n=1}^{A} |\alpha_n|^2 \qquad (9)$$

to signify that there is a small loss in the approximation. An example of this change of basis is the Karhunen-Lóeve transform for data compression, where the basis vectors $f_n$ are the eigenvectors associated with the A-largest eigenvalues ($\alpha_n^2$).

Preferred implementations of the FIG. 3 system utilize the representation in Equation 7 to reduce the computational complexity in finding both filters. As shown in FIG. 3, the energy concentration filter (ECF) 322 is determined first by the ECF Design 324 module. ECF 322 maximizes the performance criterion and concentrates the energy within the target delay-spread (i.e., the CP duration) allowed by the system of interest. ECF 322 may, in particularly preferred embodiments, maximize the SNR using a matched-filter. This filtering has the effect of increasing the number of coefficients representing the overall channel comprised of the channel 310 convolved with the ECF 322. In addition, the filtering may result in a large amount of energy outside the target delay spread, which may degrade performance. Therefore, the ECF 322 most preferably concentrates energy within the target delay spread and the IRTC filter 327 cancels energy that lie outside of the target delay spread.

Preferred implementations of the FIG. 3 system determine the coefficients of the energy concentration filter vector ECF 322 ($f_{ec}$) consistent with Equation 7 as follows, $$f_{ec} = f_1 - F\alpha \qquad (10)$$

where the term $f_1$ represents the vector of the seed filter. In the process to maximize the SNR, $f_1$ may for example be selected as $$f_1 = \frac{h^*}{\|h\|} \qquad (11)$$

which is the complex conjugate of the normalized estimated channel 310 coefficients. Those skilled in the art will recognize that various methods can be used to estimate the channel coefficients, if the modulation and training sequence are known.

Different initializations from that of Equation 11 can be used and are advantageous under certain circumstances. For instance, the initialization vector may consist of an eigenvector associated with the largest eigenvalue in the auto-covariance matrix for the input signal.

Various methods are known to generate a set of mutually orthogonal basis vectors using a normalized vector. One conventional method is the Gram-Schmidt orthogonalization process, where the basis vectors $f_2$ to $f_A$ are iteratively calculated $$f_n = f(f_{n-1}) \qquad (12)$$

for n=2, ..., A. That is, $f_n$ is a function of $f_{n-1}$ only. Therefore, $f_1$ serves as a seed to the procedure for generating the remainder of the basis vectors. The selection of an orthogonalization procedure is application dependent and is preferably selected to account for the complexity of the target system and the stability and numerical sensitivity desired for the communication system.

If the auto-covariance matrix $R_y$ is calculated for the input signal, a set of iterative calculations can be used to generate the basis vectors using the Lanczos method:

$$\text{initial conditions } f_0 = 0; \, \delta_0 = 0; \, f_1 = \frac{h^*}{\|h\|} \qquad (13)$$

iterations:

for $n = 1, 2, \ldots, A$ $d_n = f_n^H Y$ $\hat{p}_n = R_y f_n$ $\rho_n = f_n^H \hat{p}_n$ $p_n = \hat{p}_n - \delta_{n-1} f_{n-1} - \rho_n f_n$ $\delta_n = \|p_n\|$ $f_{n+1} = p_n / \delta_n$ This iteration is a simplification of the Arnoldi iteration method and is accurate if the auto-covariance matrix $R_y$ has Toeplitz characteristics. Since this is the case for the auto-covariance matrices of received signals, the iteration method of Equation 13 can properly be used and is particularly preferred for those applications.

The Lanczos method as illustrated in Equation 13 calculates the auto-covariance matrix and reuses that matrix at each iteration n. The auto-covariance matrix is not known a priori at the receiver, and it is estimated from the received signal y[n]. The estimate of the auto-covariance matrix can be given by $$\hat{R}_y = \sum_{n=1}^{N} y[n]y^H[n] = YY^H \quad (14)$$

where y[n] is the same as in the linear model described in Equation 2, and comprised of the elements, for example, $$y^H[n]=[y^*[n]y^*[n-1]\ldots y^*[n-L_f-1]] \quad (15)$$

Substituting Equation 15 into 13 modifies the iteration strategy of Equation 13 to be, $$\text{initial conditions } f_0 = 0; \delta_0 = 0; f_1 = \frac{h^*}{\|h\|} \quad (16)$$

iterations:

for $n = 1, 2, \ldots, A$ $d_n = f_n^H Y$ $\hat{p}_n = \hat{R}_y f_n = YY^H f_n = Y d_n^H$ $\rho_n = f_n^H \hat{p}_n$ $p_n = \hat{p}_n - \delta_{n-1} f_{n-1} - \rho_n f_n$ $\delta_n = \|p_n\|$ $f_{n+1} = p_n / \delta_n$ which shows the calculations operating on the input data over a pre-determined interval N. Equation 12 can be expressed more explicitly as $$f_n = f(f_{n-1}, Y) \quad (17)$$

where the modifications shown in Equation 16 simplify the implementation.

Additional simplifications can be made to the iteration strategy of Equation 16 to better suit the hardware or software used to implement the FIG. 3 filters or to accommodate the system constraints. Implementations of the FIG. 3 system involve signal filtering (e.g., $f_n^H Y$) and filter normalization, which are readily implemented in hardware or software, particularly using with dot-product DSP engines to carry out efficient filtering computations. In some communication systems, the symbol boundary may limit the value of N in Equation 14. Under those conditions, the value of N may not be long enough for a reliable estimate of the auto-covariance matrix. In such instances, implementations of the filtering strategy preferably average over multiple symbols.

Completing the calculation of the basis vectors F preferably determines the value of A. This is preferably done via simulations and sample channels for the communication system of interest. The value of A is that which concentrates a necessary amount of energy within the target maximum delay spread for the worst-case channel.

Under the conditions where the seed vector differs from that illustrated in Equation 11, the iteration strategy discussed above may not offer the best stability in generating the basis matrix F. For example, if the seed vector is an eigenvector, it may be advantageous to use other basis-generating algorithms, such as Gram-Schmidt orthogonalization.

The process of determining the filter continues by determining the coordinates $\alpha$ by exploiting the properties of F inherent to the model described above. Since F provides a subspace approximation, the value of $\alpha$ preferably is determined via a least squares implementation. The determination begins with $f_{ec}$ as low-rank approximation to an equalizer based on a Wiener filter, though the low value of A will make that assumption a poor approximation. The formulation begins with, $$R_y f_{ec} \cong f_1 \quad (18)$$

and substitutes the subspace approximation to $f_{ec}$ and leads to the following representation for $\alpha$:

$$\alpha = (F^H R_y F)^{-1} F^H R_y f_1 \quad (19)$$

The determination substitutes the estimate of $R_y$ into Equation 19 and it yields, $$\alpha = (F^H YY^H F)^{-1} F^H YY^H f_1 \quad (20)$$

$$= \left( \begin{bmatrix} d_2 \\ d_3 \\ \vdots \\ d_A \end{bmatrix} [d_2^H \; d_3^H \; \cdots \; d_A^H] \right)^{-1} \begin{bmatrix} d_2 \\ d_3 \\ \vdots \\ d_A \end{bmatrix} d_1^H$$

$$= T_A^{-1} \begin{bmatrix} d_2 d_1^H \\ d_3 d_1^H \\ \vdots \\ d_A d_1^H \end{bmatrix}$$

where $T_A$ is the Hessenberg matrix or a tri-diagonal matrix. That is, $d_{k+n} d_k^H = 0$ for $n > 1$. Therefore, the matrix inversion in Equation 20 for small values of A is not very complex to implement due to the tri-diagonal nature of $T_A$. The tri-diagonal property for filter outputs $d_n$ simplifies Equation 20 to, $$\alpha = T_A^{-1}(d_2 d_1^H) \quad (21)$$

$$= \begin{bmatrix} \rho_1 & \delta_1 & 0 & \cdots & 0 \\ \delta_1 & \rho_2 & \delta_2 & \cdots & 0 \\ 0 & \delta_2 & \rho_3 & \ddots & \vdots \\ \vdots & \vdots & \ddots & \ddots & \delta_{A-1} \\ 0 & 0 & 0 & \delta_{A-1} & \rho_A \end{bmatrix}^{-1} (d_2 d_1^H)$$

Under some advantageous averaging methods that might be used to estimate the basis vectors, the tri-diagonalization conditions may be violated, and appropriate corrections are preferably made to the derivation above. One such correction may substitute the Lanczos algorithm for the more robust Arnoldi algorithm.

The ECF 322 maximizes the performance criterion and concentrates energy within the target delay spread as preferred for the communication system of interest. Although in some instances, for a certain class of channels, the ECF 322 will have A=1, other types of difficult channels will require A>1 and Equation 10 is used with a non-zero F.

A preferred sequence for determining the ECF Design 324 includes:

1: set the seed vector $f_1$ to the normalized matched filter as in, for example, Equation 11;
2: if A>1, then generate the A-1 basis vectors that form F using the procedure in Equation 16, for example;
3: determine the coordinates in vector α according to Equation 21; and
4: determine the ECF coefficients ($f_{ec}$) according to Equation 10.

The illustrated determination of $f_{ec}$ allows different algorithms to be used for the initialization of the seed vector $f_1$, the generation of the basis vectors F and the computation of the coordinates α. Those skilled in the art will easily determine the most appropriate methods for different systems.

Implementations of a CSF 320 of FIG. 3 according to preferred aspects of the invention cancel the coefficients corresponding to the tails of the combined channel 310 and ECF 322 impulse response. The tail-coefficients are those coefficients in the combined response that are outside of the target delay spread. The impulse response tails cancellation (IRTC) filter 327 cancels the coefficients and removes ISI outside of the target delay spread target.

Preferred implementations of the FIG. 3 CSF 320 have an overall impulse response, when convolved with the channel 310, determined by (in the noiseless case for clarity), $$Hf_{ec} - Hg_{tc} = C_H Hf_{ec} \quad (22)$$

where $g_{tc}$ is the IRTC filter 327, and $C_H$ has the form, $$C_H = \begin{bmatrix} 0 & 0 & 0 \\ 0 & I_{ds} & 0 \\ 0 & 0 & 0 \end{bmatrix} \quad (23)$$

where $I_{ds}$ is an identity matrix with a size equal to the number of coefficients in the target delay spread window. The location of $I_{ds}$ is determined so that the power in $C_H Hf_{ec}$ most preferably is a maximum. $C_H Hf_{ec}$ is the TIR for the CSF in particularly preferred embodiments. This maximum is simply the symmetric window around the peak in the response $Hf_{ec}$ when $f_1$ is the matched-filter as stated in the preferred embodiment description for ECF 322.

The IRTC filter ($g_{tc}$) 327 design preferably follows the same approach as in the ECF 322, but with a modified set-up in the stage corresponding to Equation 18. The calculation of the IRTC filter coefficients has a similar form to Equation 10 for the ECF, $$g_{tc} = g_1 - G\beta \quad (24)$$

where the seed vector $g_1$ is initialized to be, $$g_1 = f_{ec} \quad (25)$$

and equation 22 simplifies to, $$HG\beta = C_H Hf_{ec} \quad (26)$$

Equation 26 is determined in the IRTC Filter Design 326 by generating the basis G and calculating the coordinates in β. The procedure in generating these two quantities follows the same approach given for F and α in determining the ECF 322.

The basis generation procedure generally follows Equation 16, $$\begin{aligned} &\text{initial conditions: } g_0 = 0; \delta_0 = 0; g_1 = f_{ec} \\ &\text{iterations:} \\ &\text{for } n = 1, 2, \ldots, B \\ &d_n = g_n^H Y \\ &\hat{p}_n = \hat{R}_y g_n = YY^H g_n = Y d_n^H \\ &\rho_n = g_n^H \hat{p}_n \\ &p_n = \hat{p}_n - \delta_{n-1} g_{n-1} - \rho_n g_n \\ &\delta_n = \|p_n\| \\ &g_{n+1} = p_n / \delta_n \end{aligned} \quad (27)$$

where the value of B most preferably is determined by simulation, and generally speaking $B \geqq A$.

Determining β differs from determining α in the solution of the IRTC filter having a target response as noted in Equation 26. Most preferably the FIG. 3 system chooses $C_H Hf_{ec}$ as the TIR for the CSF, though alternate TIRs can be used. β then is, $$\beta = T_B^{-1}(G^H(Y((C_H Y^H) f_{ec}))) \quad (28)$$

where $T_B$ is the Hessenberg Matrix obtained from the values in Equation 27. The parentheses prioritize the matrix multiplications as preferred for computational efficiency. Knowledge of the channel is used to compute the convolutions in $H^H C_H Hf_{ec}$. Unlike Equation 21, Equation 28 is not a scalar times the Hessenberg Matrix inverse. Other TIRs can result in further simplifications in the computations of Equation 28 when traded-off against performance.

The IRTC filter 327 most preferably cancels the expanded time span of the combined channel 310 and ECF 322 impulse response. For example, the cancellation may proceed by zeroing out the taps of a filter or by ignoring the outputs of the taps of a filter. The cancellation is particularly preferred since CSF filters not only provide a maximization of a performance criterion, but also keep the coefficients within the target delay spread. The computation of the IRTC filter coefficients follows a similar computational method as the coefficients of the ECF, with a major difference in the set-up for the calculations of the coordinates in β.

Most preferably the IRTC Filter Design 326 proceeds as follows:

1: set the seed vector $g_1 = f_{ec}$ as in Equation 25
2: generate the B-1 basis vectors that form G using the procedure in Equation 27, for example.
3: calculate the coordinates in vector β from Equation 28
4: compute the IRTC filter coefficients ($g_{tc}$) from Equation 24

The proposed computation for $g_{tc}$ admits different algorithms for the generation of the basis vectors G, and the computation of the coordinates β. Furthermore, the TIR in Equation 26 can be chosen to be a different formulation that is more advantageous in regards to performance vs. complexity tradeoffs. Those skilled in the art will easily determine the most appropriate method to compute the values.

Wireless OFDM systems may employ the use of a cycle prefix (CP) to mitigate inter-symbol interference (ISI). Many standards predetermine or select CP-lengths to combat ISI, in particular by choosing a sufficiently long CP. The use of long CPs reduces the achievable bit-rates and generally does not mitigate against interference. The use of long CPs also do not prevent symbol outages in time-varying channels that momentarily exceed the CP length. Implementations of the systems described above can have the advantage of reducing the required CP length, thus increasing and in preferred implementations maximizing throughput bit-rates. Furthermore, the CSF design's cost function can be chosen for interference mitigation, while still offering time-varying channel tracking with tractable complexity for mobile receivers.

In the filter design illustrated in FIG. 2, the output of the summer is driven to zero in the design procedure, in order to determine the CSF 220. In the filter of FIG. 3, the output of the summer is driven to the target impulse response (TIR). FIG. 3 shows two filter components. That configuration is particularly preferred. That configuration does not necessitate two physically separate circuits. For example, the FIG. 3 implementation can be implemented in a single DSP. When implemented in a single DSP or similar structure, the ECF and IRTC components are successively determined so that they are operationally separate processes. What is illustrated in FIG. 3 proceeds by designing the optimized (SNR, SINR, etc.) ECF filter based on the channel estimate, but preferably does not shrink the channel itself The IRTC filter uses the ECF filter, a modified channel estimate and the input signal to "extract" the TIR and to shrink the channel.

The present invention has been described in terms of certain preferred embodiments thereof. Those of ordinary skill in the art will appreciate that various modifications might be made to the embodiments described here without varying from the basic teachings of the present invention. Consequently the present invention is not to be limited to the particularly described embodiments but instead is to be construed according to the claims, which follow.

I claim:

1. A communication system including a channel shortening filter, the channel shortening filter comprising,
    an energy concentration filter receiving an input signal corresponding to a signal received from a channel, the energy concentration filter adapted to concentrate energy within a predetermined delay spread of the channel according to a performance criterion, the energy concentration filter generating a subspace approximation of an energy concentration filter comprising determining a set of energy concentration basis vectors and a corresponding set of energy concentration coordinates; and
    a cancellation filter responsive to a combined impulse response of the channel and the energy concentration filter, the cancellation filter generating a subspace approximation of a cancellation filter comprising determining a set of cancellation basis vectors and a corresponding set of cancellation coordinates, the cancellation filter providing an output that adjusts an output of the energy concentration filter to correspond to a target impulse response for the channel.

2. The system of claim 1, wherein the energy concentration filter uses a signal to noise ratio to concentrate energy within the predetermined delay spread.

3. The system of claim 1, wherein the energy concentration filter uses a signal over interference to noise ratio to concentrate energy within the predetermined delay spread.

4. The system of claim 1, wherein the energy concentration filter and the cancellation filter are implemented at least in part in a digital signal processor.

5. A communication system including a channel shortening filter, the channel shortening filter comprising:
    an energy concentration filter receiving an input signal corresponding to a signal received from a channel, the energy concentration filter adaptive to the channel to optimize energy within a target delay spread of the channel according to a performance criterion, the energy concentration filter comprising a energy concentration subspace approximation of an determined from a set of energy concentration basis vectors and a corresponding set of energy concentration coordinates, the set of energy concentration basis vectors derived from a seed vector responsive to estimated channel coefficients; and
    an impulse response, tail canceller filter responsive to the channel and the energy concentration filter to identify coefficients of the energy concentration filter outside of the target delay spread of the channel and to provide an output that cancels the coefficients of the energy concentration filter outside of the target delay spread of the channel, the tail canceller filter comprising a tail canceller subspace approximation determined by a set of canceller basis vectors and a corresponding set of canceller coordinates, the tail canceller subspace approximation responsive to the energy concentration filter.

6. The system of claim 5, wherein the energy concentration filter optimizes to a signal to noise ratio criterion.

7. The system of claim 5, wherein the energy concentration filter optimizes according to a signal over interference to noise ratio.

8. A communication system including a channel shortening filter, the channel shortening filter comprising:
    an energy concentration filter receiving an input signal corresponding to a signal received from a channel, the energy concentration filter optimizing an energy distribution within a target delay spread of the channel according to a performance criterion, the energy concentration filter comprising a subspace approximation determined from a set of energy concentration basis vectors and a corresponding set of energy concentration coordinates, the subspace approximation responsive to an autocorrelation of the input signal; and
    an impulse response tail canceller filter responsive to the channel and the energy concentration filter to identify coefficients of the energy concentration filter outside of the target delay spread of the channel and to provide an output that cancels the coefficients of the energy concentration filter outside of the target delay spread of the channel, the impulse response tail canceller filter comprising a subspace approximation determined by a set of canceller basis vectors and a corresponding set of canceller coordinates.

9. The system of claim 8, the energy concentration filter optimizing a signal to noise ratio to concentrate energy within the target delay spread.

10. The system of claim 8, the energy concentration filter optimizing a signal over interference to noise ratio to concentrate energy within the target delay spread.

11. The system of claim 1, wherein the energy concentration filter and the cancellation filter are physically separate circuits.

12. The system of claim 1, wherein the energy concentration filter and the cancellation filter are implemented within a processor and are sequentially determined.

13. The system of claim 1, wherein the communication system is a wireless system and the channel is characteristic of a wireless system.

* * * * *